United States Patent [19]

Stogryn et al.

[11] 3,721,698

[45] March 20, 1973

[54] 1,4-BIS-[TRIS-(NF2)METHOXY]-2,3-DINITROXYBUTANE

[75] Inventors: Eugene L. Stogryn, Fords; Joel G. Berger, Elizabeth, both of N.J.; David S. Bosniack, New York, N.Y.

[73] Assignee: Esso Research and Engineering Company

[22] Filed: Sept. 3, 1964

[21] Appl. No.: 395,110

[52] U.S. Cl. ............260/467, 149/19, 149/22, 149/76, 149/88, 260/584 C
[51] Int. Cl. ..............................C07c 77/02
[58] Field of Search ...............260/584 C, 467

[56] References Cited

UNITED STATES PATENTS 3,331,867   7/1967   Smiley...................260/467
3,410,870   11/1968  Glassboro et al...........260/467 X

*Primary Examiner*—Leland A. Sebastian
*Attorney*—Welan, Chasan, Litton, Marx and Wright and Henry Berk

EXEMPLARY CLAIM

1. The compound 1,4-bis-[tris-(NF$_2$)methoxy]-2,3-dinitroxybutane having the compositional formula:

(NF$_2$)$_3$COCH$_2$CH(ONO$_2$) CH(ONO$_2$)CH$_2$OC(NF$_2$)$_3$.

6 Claims, No Drawings

1,4-BIS-[TRIS-(NF2)METHOXY]-2,3-DINITROXYBUTANE

This invention relates to new high energy oxidizers that combine the energetic advantages of difluoramino and nitrato groups in isomeric compounds formed by the nitration of cis and trans isomers of 1,4-bis-[tris-(NF$_2$)methoxy]-2-butene oxide, which is given the abbreviated name FABDE. These isomeric compounds containing the nitroxy or nitrato (—ONO$_2$) groups linked to the carbon atoms which in the parent compound are in the oxide ring linkage are nonvolatile. One of the isomers, the threo isomer, is a liquid; and the other which is the meso or erythro isomer is a solid.

In particular, the new isomeric nitrates of FABDE prepared in accordance with the present invention are the threo and erythro isomers of 1,4-bis-[tris-(NF$_2$)methoxy]-2,3-dinitroxybutane which is represented by the following compositional formula:

(NF$_2$)$_3$COCH$_2$CH(ONO$_2$)CH(ONO$_2$)CH$_2$OC(NF$_2$)$_3$

An abbreviated name for this dinitrate of FABDE is FABDE-DN. These FABDE-DN compounds have been determined to have a number of important properties which make them useful in solid racket propellant formulations. They are readily made in good yields and high purity. They have suitable stability and compatibility with other ingredients for producing the propellant composites with other high energy ingredients.

The starting compounds for the synthesis of the FABDE-DN isomers are the cis and trans isomers of 1,4-bis-[tris-(NF$_2$)methoxy]-2-butene oxide. The cis and trans isomers of FABDE are prepared by reacting the cis or trans isomer of 1,4-dihydroxy-2-butene oxide with perfluoroguanidine in an adductive reaction and the resulting adduct is fluorinated. The synthetic route is given as follows:

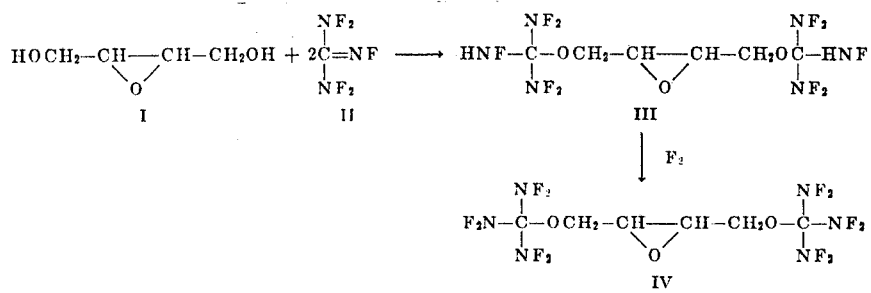

This preparation is described in application Ser. No. 386,088 filed by E. L Stogryn et al. on July 29, 1964, now U.S. Pat. No. 3,564,023.

In making the cis-FABDE, the cis isomer of 1,4-dihydroxy-2-butene oxide is prepared by epoxidation of commercially available cis-1,4-dihydroxy-2-butene. This isomer is used as reactant I to be reacted with the perfluoroguanidine in acetonitrile with urea present as catalyst. The reaction is stirred at room temperature overnight and after removal of unreacted gases the solution is treated with a stream of mixed fluorine and nitrogen gas for several hours to fluorinate the adduct product III. The temperature of reaction for the fluorination is low, e.g., −25°C. To recover the cis-FABDE product III the acetonitrile is stripped off leaving a viscous residue which is dissolved in halogenated hydrocarbon, e.g., Freon 113 or CCl$_4$ and dried with anhydrous Na$_2$CO$_3$. The dried solution is filtered and the solvent blown off. Then the residue is placed on a silica gel column for chromatographic purification.

The preparation of the trans-FABDE is carried out in the similar manner as the preparation of the cis-FABDE isomer starting with trans-1,4-dihydroxy-2-butene oxide as the reactant I which is obtained by the caustic treatment of commercially available trans-1,4-dichloro-2-butene followed by epoxidation.

The threo and meso or erythro FABDE-DN compounds are made in high yields by reaction of nitric acid with the cis and trans-FABDE compounds respectively as shown below.

TABLE I

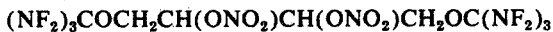

| FABDE | Product | Product composition |
| --- | --- | --- |
| Cis | Threo-FABDE-dinitrate | (NF$_2$)$_3$COCH$_2$C(ONO$_2$)(H)—C(H)(ONO$_2$)CH$_2$OC(NF$_2$)$_3$ |
| Trans | Erythro-FABDE-dinitrate | (NF$_2$)$_3$COCH$_2$C(H)(ONO$_2$)—C(H)(ONO$_2$)CH$_2$OC(NF$_2$)$_3$ |

Threo-FABDE-DN ......... Meso or erythro-FABDE-DN.

Either of the FABDE isomers is reacted with 98% $HNO_3$ in methylene chloride or other inert diluents at ambient or refluxing temperatures. After the reaction, the products are purified to the desired extent for the recovery of a final purified product illustrated in the following examples.

EXAMPLE 1

Synthesis of threo-1,4-bis-[tris-($NF_2$)methoxy]-2,3-dinitroxybutane

To a solution of 1.0 g. of cis-FABDE in 5 ml. of $CH_2Cl_2$ was added 4 ml. of 98% $HNO_3$ in 2 ml. of $CH_2Cl_2$. After refluxing for four hours the cooled reaction mixture was poured into ice-water. The methylene chloride solution was washed with water, a dilute sodium carbonate solution, and dried over $MgSO_4$.

A capillary G.C. of the crude reaction mixture showed it was a mixture of dinitrate and mono-nitrate in a ratio of 75/25, respectively.

The nitrate was purified by column chromatography on base treated silica gel (20 times the weight of the adduct). Elution with $CCl_4$ gave pure threo-FABDE dinitrate in 67 percent yield. The dinitrate is a colorless viscous oil.

Chloroform displaced the mono-nitrate from the column. After recrystallization from pentane the mono-nitrate melted at 40°C.

The dinitrate product was analyzed and found by elemental analysis to have a composition in agreement with the calculated analysis for $C_6H_6N_8O_8F_{12}$ and infrared and N.M.R. analysis to have the following structure:

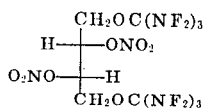

EXAMPLE 2

Synthesis of erythro-1,4-bis-[tris-($NF_2$)methoxy]-2,3-dinitroxybutane

A solution of trans-FABDE (4.2 g.) in 70 mls. of $CH_2Cl_2$ was treated with 14 mls. of 98% $HNO_3$, and the mixture allowed to stir at ambient temperature for 2½ days. At the end of this time, the excess $HNO_3$ was removed by several water washes, and the $CH_2Cl_2$ solution dried. Removal of solvent gave 3.9 g. of crude oily product, which was chromatographed on silica gel using $CHCl_3$ as the eluent. Purity of the eluted material was monitored by use of thin layer chromatography (silica gel layer). Cuts which showed only one spot were dissolved in pentane and recrystallized several times from this solvent to yield solid dinitrate m.p. 35° to 37°C.

The dinitrate product was identified by an elemental analysis to have the composition calculated for $C_6H_6N_8O_8F_{12}$ and by N.M.R. and infrared analysis to have the structure shown below:

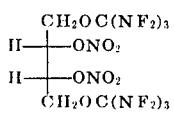

Significant properties and a comparison of property differences between the FABDE-DN isomers are listed as follows:

A. The erythro isomer, which is solid, has the higher melting point.
B. The erythro isomer is less sensitive.
C. Both isomers have similar high stabilities, DTA and VTS. DTA, the differential thermal analysis exotherm temperature, is a measure of stability to decomposition and heated to the temperatures set forth. VTS is the measure of gaseous decomposition under controlled time and temperature for the purpose of determining thermal stability.

A number of solid rocket formulations have been made with the FABDE-DN isomers and it was found that they can be used advantageously with energetic polymers or with nonenergetic polymers in the binders. The liquid threo-isomer acts as a suitable plasticizer with solid partially hydrolyzed polyvinyl alcohol-trityl triisocyanate which is shown to be a highly useful nonenergetic binder polymer in application Ser. No. 396,479 filed by A. H. Muenker et al. on Sept. 11, 1964.

Compositions of 288+ Isp level containing the threo-FABDE-DN have been formulated and tested for burning rates. The physical properties of the solid racket propellant grains made with this dinitrate plasticizer used in high proportion to the polymer were found to be satisfactory. Characteristics of two compositions formulated are given in the following table.

TABLE II

Cure Conditions: 5 days at room temperature

HPVA = Polyvinyl acetate alcohol, % hydrolysis 24.9

| Composition | Theor. Isp (psi) | Tensile Strength | % Elongation |
|---|---|---|---|
| 43.2% Binder (5/1 Dinitrate /HPVA) | 288 | 91 | 25 |
| 42.5% Solid Poly FABDE | | | |
| 12.7% Ammonium Perchlorate | | | |
| 1.6% Boron Powder | | | |
| % Tris Compounds: 78.5% | | | |
| 45% Binder (8/1 Dinitrate /HPVA) | 293.5 | 44 | 25 |
| 42% Poly FABDE | | | |
| 10.5% Ammonium Perchlorate | | | |
| 2.5% Boron Powder | | | |
| % Tris Compounds: 82.3% | | | |

The formulations containing the FABDE-DN plasticizer have high burning rates, e.g., 1.2 in./sec. at 100 psig and 2.81 in./sec. at 300 psig.

The solid erythro-FABDE-DN isomer is useful with respect to increasing the thickness or solidity of the compositions in replacing part of the liquid isomer with the added advantage of lowering sensitivity. The FABDE-DN compounds herein provided can be used in various other formulations with various energetic $NF_2$-containing polymers, nitrate-containing polymers in formulating compositions with various powdered fuels and oxygen-supplying oxidizers.

The invention described is claimed as follows:

1. The compound 1,4-bis-[tris-($NF_2$)methoxy]-2,3-dinitroxybutane having the compositional formula:

$(NF_2)_3COCH_2CH(ONO_2)CH(ONO_2)CH_2OC(NF_2)_3$

2. The compound threo-1,4-bis-[tris-($NF_2$)methoxy]-2,3- dinitroxybutane having the compositional formula:

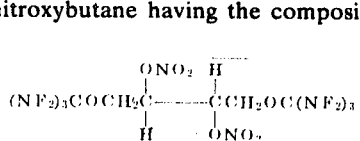

3. The compound erythro-1,4-bis-[tris-(NF$_2$)methoxy]-2,3-dinitroxybutane having the compositional formula:

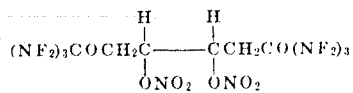

4. Process for preparing 1,4-bis-[tris-(NF$_2$)methoxy]-2,3-dinitroxybutane which comprises reacting 1,4-bis-[tris-(NF$_2$)methoxy]-2-butene oxide with nitric acid to form the compound 1,4-bis-[tris-(NF$_2$)methoxy]-2,3-dinitroxybutane as product, and recovering said product.

5. In the process of claim 4, reacting the cis isomer of 1,4-bis[tris-(NF$_2$)methoxy]-2-butene oxide with nitric acid to form the threo-1,4-bis-[tris-(NF$_2$)methoxy]-2,3-dinitroxybutane as product, and recovering said product.

6. In the process of claim 4, reacting the trans isomer of 1,4-bis-[tris-(NF$_2$)methoxy]-2-butene oxide with nitric acid to form erythro-1,4-bis-[tris-(NF$_2$)methoxy]-2,3-dinitroxybutane as product, and recovering said product.

* * * * *